United States Patent
Ochi et al.

(10) Patent No.: US 8,213,275 B2
(45) Date of Patent: Jul. 3, 2012

(54) OBJECT LENS ACTUATOR AND DISC DRIVE USING THE SAME

(75) Inventors: Manabu Ochi, Hitachinaka (JP);
Katsuhiko Kimura, Kasumigaura (JP);
Takahiro Yamaguchi, Yokohama (JP);
Souichirou Yamada, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/207,518

(22) Filed: Aug. 11, 2011

(65) Prior Publication Data
US 2012/0051197 A1 Mar. 1, 2012

(30) Foreign Application Priority Data
Aug. 27, 2010 (JP) ................................. 2010-190769

(51) Int. Cl.
*G11B 7/00* (2006.01)
(52) U.S. Cl. .................. 369/44.15; 369/44.14
(58) Field of Classification Search .......................... None
See application file for complete search history.

(56) References Cited

U.S. PATENT DOCUMENTS

| 2003/0174596 A1* | 9/2003 | Wakabayashi et al. .... 369/44.16 |
| 2005/0243663 A1* | 11/2005 | Nogami ...................... 369/44.16 |
| 2006/0233069 A1* | 10/2006 | Mori et al. .................. 369/44.15 |

FOREIGN PATENT DOCUMENTS
JP 8-297847 11/1996
* cited by examiner

*Primary Examiner* — Paul Huber
(74) *Attorney, Agent, or Firm* — Antonelli, Terry, Stout & Kraus, LLP.

(57) ABSTRACT

The present invention provides an object lens actuator in which a tilt of an object lens due to a change of an ambient temperature is inhibited even when a metal member is attached to a resin based securing part. It is desirable to improve quality of writing and playing in a disc drive using the object lens actuator. This is achieved by coupling a metal member having a flat portion and bent portions to a securing part near top ends of the bent portions. The flat portion has a normal in the focusing direction. The bent portions extend in the focusing direction from the respective ends of the flat portion in the tracking direction. The securing part has an opening therethrough in the focusing direction, and in the opening, the metal member and the securing part may be coupled between each outermost two support members in the focusing direction.

10 Claims, 4 Drawing Sheets

OBJECT LENS ACTUATOR AND DISC DRIVE USING THE SAME

BACKGROUND OF THE INVENTION

1. Field of the Invention

The present invention relates to an object lens actuator and a disc drive using the actuator.

2. Related Art of the Invention

In a disc drive for writing information onto disc-shaped information writing media or playing written information, a higher data transfer rate is facilitated by rotating an optical disc at a high speed.

For this reason, the disc drive may need to write or play information correctly by making a position of a focal point of an object lens follow a track on a disc. The disc drive includes an object lens actuator to move the object lens in the focusing direction and the tracking direction.

Popular object lens actuators include a magnetic circuit having a yoke and a permanent magnet, a moving part having a lens holder attaching an object lens, a focusing coil, and a tracking coil thereto, and a securing part elastically supporting the moving part movably via linear support members.

In such an object lens actuator, when the object lens is tilted, aberration may occur to worsen quality of writing and play signals. Therefore, it may be necessary to inhibit the tilt of the object lens.

As a related art of inhibiting a tilt of an object lens, an object lens actuator disclosed in JP-A No. H08-297847 (Claim 9, FIGS. 10 to 13) is known in which a plate spring is attached to a raised portion of a securing base (hereinafter called a yoke) by use of securing screws and a projection is provided downward from a bottom surface of the yoke. In JP-A No. H08-297847 (Claim 9, FIGS. 10 to 13), two screws are used for assembling to adjust a tilt of the object lens by use of the projection as a fulcrum while biasing the yoke by use of the plate spring.

SUMMARY OF THE INVENTION

In the above related art, the plate spring and a spacer (hereinafter called a securing part) are attached to the yoke by use of the securing screws. Therefore, when the securing part is formed by resin, and the yoke, plate spring, and securing screws are metal, the securing part warps by deformation of the metal due to thermal stress caused by a difference between coefficients of linear expansion of the components in response to a change of an ambient temperature. As a result, the object lens attached to the securing part via the support members may be tilted.

It is desirable to provide an object lens actuator in which a tilt of an object lens due to a change of an ambient temperature is inhibited even when metal parts are attached to a resin securing part and to improve quality of writing and playing in a disc drive using the actuator.

Means for Solving the Problem

According to one embodiment of the present invention, an object lens actuator includes: an object lens for forming a laser spot on a writing surface of an optical disc; a lens holder attaching the object lens thereto; multiple support members coupled to the lens holder; and a securing part for supporting the lens holder movably in the focusing direction and tracking direction. A metal member is attached to a space of the securing part. The space is in the focusing direction. The metal member has a flat portion and bent portions. The flat portion has a normal in the focusing direction. The bent portions extend in the focusing direction from respective ends of the flat portion in the tracking direction. Top ends of the bent portions of the metal member are coupled and secured to an inner wall of the space of the securing part.

According to one embodiment of the present invention, the bent portions are secured to the securing part by an adhesive.

According to one embodiment of the present invention, the space of the securing part to insert the metal member has a larger volume than that of the metal member.

According to one embodiment of the present invention, the metal member is secured at the central portion of the space of the securing part in the focusing direction.

According to one embodiment of the present invention, the securing part has an opening therethrough in the focusing direction. According to one embodiment of the present invention, in the opening, the metal member is secured to the securing part between each outermost two of the support members in the focusing direction.

According to the present invention, an object lens actuator can be provided in which a tilt of an object lens due to a change of an ambient temperature is inhibited even when a metal member is attached to a resin based securing part. In a disc drive using the actuator, quality of writing and playing can be improved.

DETAILED DESCRIPTION OF THE INVENTION

Now, as mentioned above, the metal member is inserted into the securing part. The metal member includes in the securing part a space larger than a volume of the metal member. The metal member is inserted into the space. The metal member is secured to a surface of the securing part by an adhesive.

However, it has been turned out that such a securing way has the following disadvantages.

Namely, it has been turned out that heat dissipation of a semiconductor device mounted in a disc drive causes thermal expansion and deformation (expansion and shrinkage) of the metal member in the securing part. The surface of the securing part is pulled by the deformation of the metal member because the securing part is secured by an adhesive. Then, the whole of the securing part warps.

Therefore, inventors of the present invention have found that there is a disadvantage in the adhesion position of the securing part and metal member by an adhesive. After various examinations, the following examples have been obtained.

Hereafter, embodiment of the present invention with reference to the drawings is explained.

EXAMPLE 1

Figure 1:
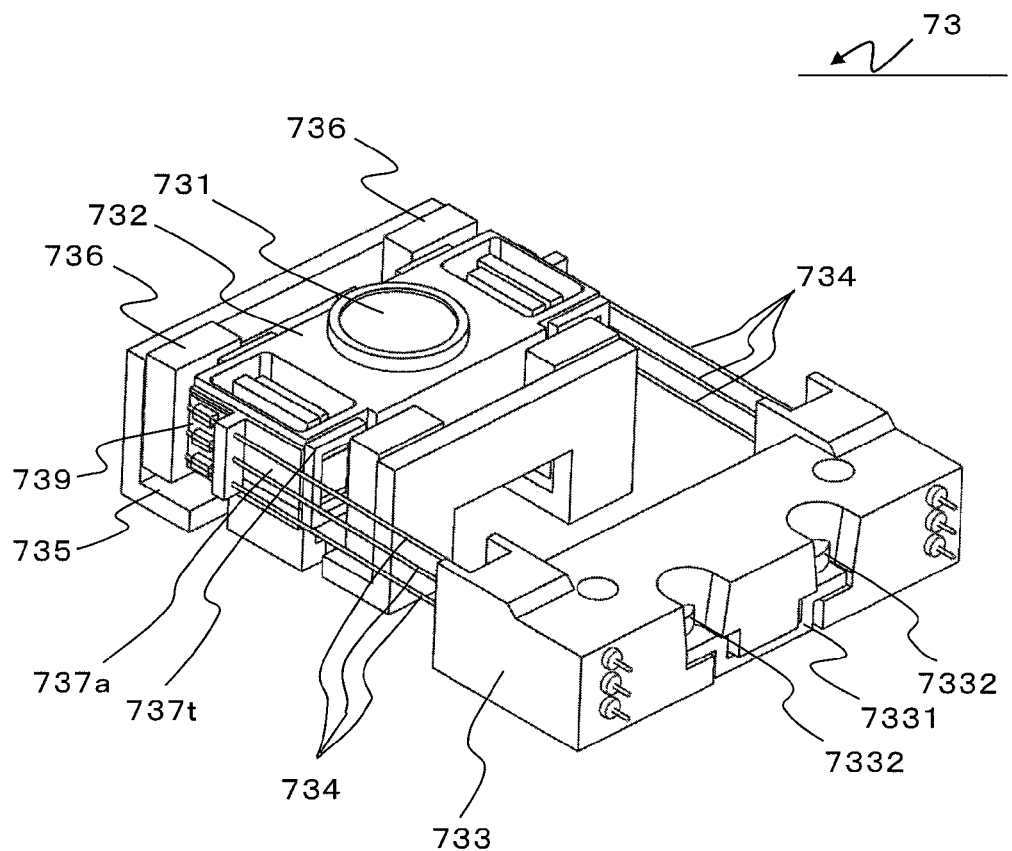
FIG. 1 is a perspective view of an object lens actuator, showing one embodiment of the present invention.
Figure 1:
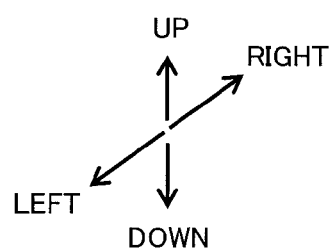

FIG. 1 is a perspective view of an object lens actuator 73 of the present invention.

In FIG. 1, when a direction of an object lens 731 toward a disc (not shown) is defined as an upward direction and a direction of the object lens 731 away from the disc is defined as a downward direction, the upward and downward direction is a focusing direction, and a direction shown by right and left in this figure is a tracking direction.

A magnetic circuit including a yoke 735 and magnets 736 is secured to the object lens actuator 73. A moving part includes an object lens 731 and a lens holder 732 attaching it thereto. A resin based securing part 733 elastically supports this moving part movably via linear support members 734.

A focusing coil 737a and a tracking coil 737t are wound around the lens holder 732. The support members 734 are electrically coupled to the focusing coil 737a and tracking coil 737t by, e.g., solder via a small substrate 739, and current is supplied from the outside to the coils. In the object lens actuator 73 of the present example, a magnetic metal member 7331 for holding the securing part 733 by a magnet at the time of assembly and adjusting a tilt of the object lens 731 is attached to a lower surface of the securing part 733 via an adhesive 7332.

In such a structure, the object lens 731 is held via the support members 734 each having one end secured to the securing part 733. Therefore, inhibition of a warp of the securing part 733 may be important to inhibit a tilt of the object lens 731.

Figure 2:
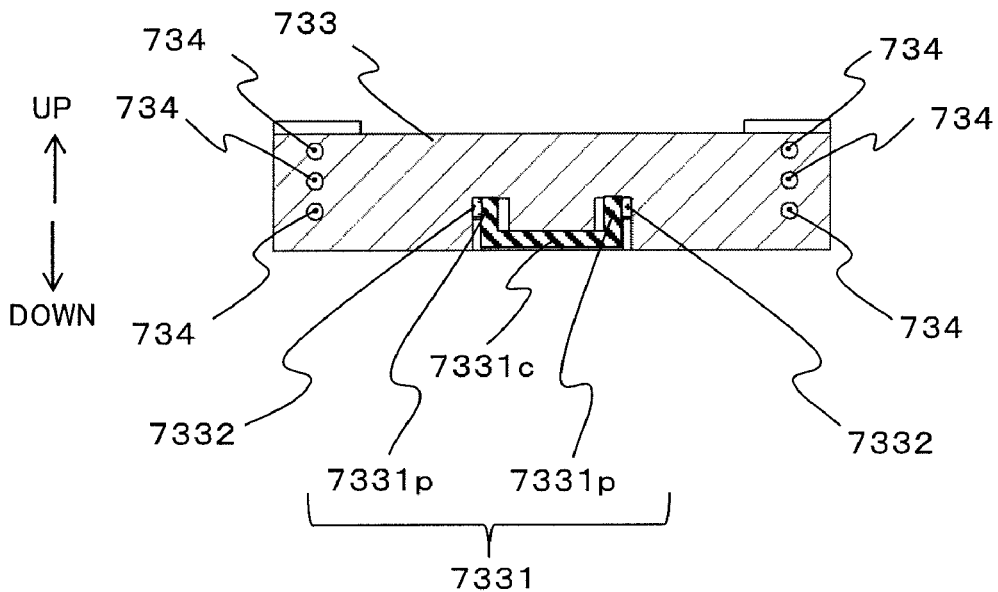
FIG. 2 is a sectional view of a securing part of the object lens actuator, showing one embodiment of the present invention.

An attachment structure of this securing part 733 and metal member 7331 is explained in detail in reference to FIG. 2.

FIG. 2 is a sectional view of the securing part 733. The present example has the following two features about the attachment of the securing part 733 and metal member 7331.

The first feature is that the metal member 7331 includes a flat portion 7331c having a normal in the vertical direction and bent portions 7331p extending upward respectively from the ends of the flat portion 7331c in the tracking direction.

The second feature is that the metal member 7331 is attached to the securing part 733 near the top ends of the bent portions 7331p by use of the adhesive 7332.

According to the two features, a strength of the metal member 7331 against a tensile force and a compressive force in the tracking direction can be reduced. For this reason, deformation due to thermal stress caused by a difference of coefficients of linear expansion of the securing part 733 and metal member 7331 in response to a change of an ambient temperature can be absorbed as deformation of the bent portions 7331p of the metal member 7331. Accordingly, compared to when the flat metal member 7331 is attached to the lower surface of the securing part 733, the warp of the securing part 733 can be reduced. Therefore, a tilt of the object lens 731 can be inhibited.

In other words, in the past, the metal member 7331 is secured near a surface of the securing part 733 by use of the adhesive 7332. In this case, when the metal member 7331 thermally expands and shrinks, the metal member 7331 pulls a portion near the surface of the securing part 733 via the adhesive 7332. Accordingly, the entirety of the securing part 733 warps.

On the other hand, in the present example, the bent portions 7331p are provided to the metal member 7331 to secure the metal member 7331 to the central portion of the space provided to the securing part 733 by the adhesive 7332. Therefore, an inner wall portion of the central portion of the space is pulled even when the metal member 7331 thermally expands or shrinks. Thus, the warp is inhibited.

However, as mentioned above, the space of the securing part 733 to insert the metal member 7331 may need to have a larger volume than that of the metal member 7331. This is because the deformation due to the expansion or shrinkage of the metal members 7331 may need to be absorbed in other than the application space for the adhesive 7332.

The adhesive 7332 is located in the central portion of the securing part 733 in the thickness direction, for example in FIG. 2.

An advantageous effect of the present example is explained in reference to a jitter as an indication.

A jitter shows time variation of a write and play signal. As a value of the jitter is small, quality of writing and playing is high. As a tilt of an object lens is large, the jitter is large. Accordingly, a smaller increase of a tilt of the object lens due to a change of an ambient temperature is desirable.

Figure 3:
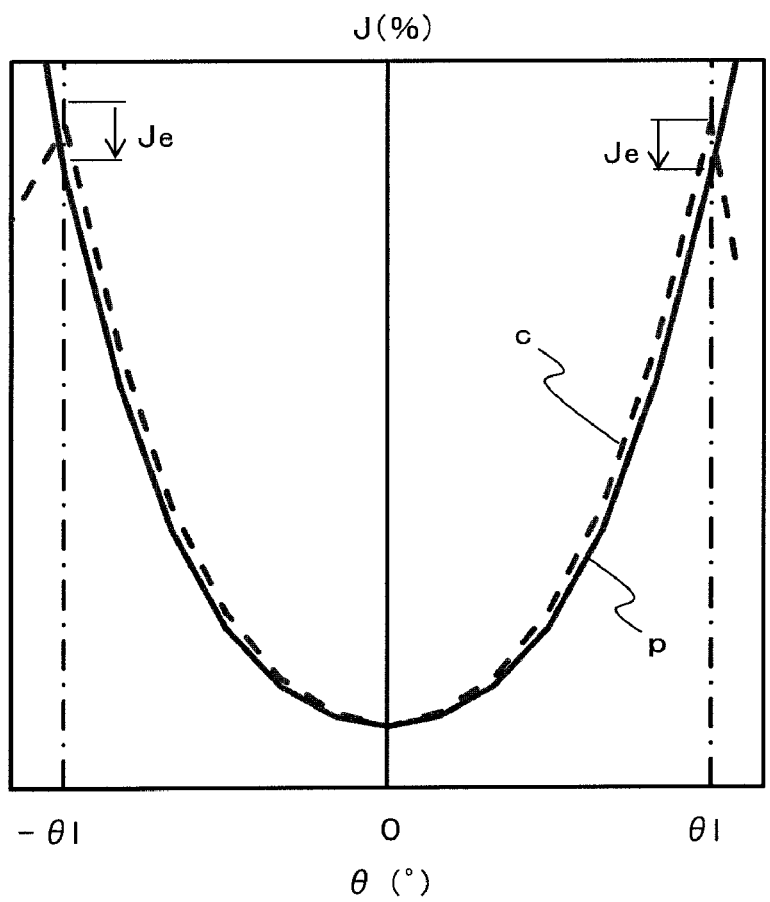
FIG. 3 is a relationship between a tilt of an object lens and a jitter, showing an advantageous effect of one embodiment of the present invention.

In FIG. 3, the horizontal line shows a tilt $\theta$ (°) of the object lens due to assembly dispersion, and the vertical line shows a jitter J (%) relative to a tilt of the object lens by taking into account a tilt of the object lens due to expansion or shrinkage caused by free expansion and shrinkage and thermal stress of components when an ambient temperature changes by 40 degree C. in addition to the assembly dispersion.

In FIG. 3A, a legend shown by the dashed line is a result of a case c of an object lens actuator in which both ends of a flat metal member are secured to a bottom surface of a securing part, and a legend shown by the solid line is a result of a case p of the object lens actuator in which the metal member 7331 is secured to the securing part 733 after the present example. When a tolerance $\pm\theta 1$ of the assembly dispersion relative to a tilt $\theta$ of the object lens is set to, e.g., $\pm 0.3°$ (shown by the chain lines in the figure), an amount of jitter reduction Je of about 0.5% can be obtained by applying the present example.

Thus, according to the features of the present example, the object lens actuator can be provided in which a tilt of the object lens due to a change of an ambient temperature is inhibited even when the metal member is attached to the resin-based securing part.

EXAMPLE 2

Figure 4:
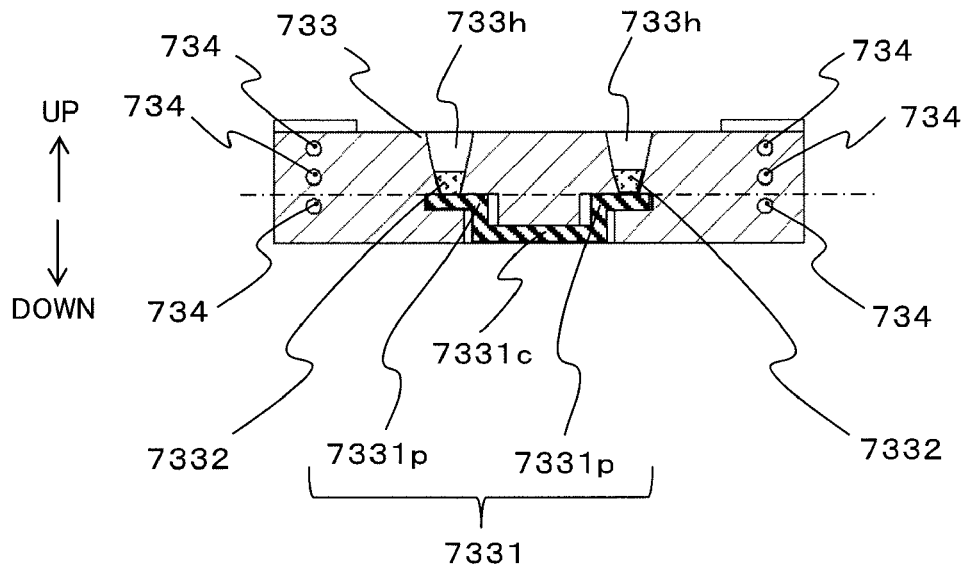
FIG. 4 is a sectional view of the securing part of the object lens actuator, showing one embodiment of the present invention.

FIG. 4 is a sectional view of the securing part 733 of the object lens actuator 73, showing the second embodiment of the present invention.

The first feature of the present example is that the securing part 733 has an opening 733h penetrating from its upper surface to lower surface. The second feature is that the securing part 733 and metal member 7331 are attached between each vertically outermost two of the support members 734.

The other structure of the present example is the same as that of the example 1, and thus not explained in detail.

In the present example, in addition to the advantageous effect of the example 1, the attachment position of the metal member 7331 and securing part 733 can be set near the vertical center of the securing part 733. Accordingly, the bent portions 7331p of the metal member can be deformed to absorb the deformation of the securing part 733 due to thermal stress caused by a difference of coefficients of linear expansion of the securing part 733 and metal member 7331 when an ambient temperature changes. Additionally, vertically symmetrical deformation of the securing part 733 can reduce the warp of the securing part 733. Therefore, a tilt of the object lens 731 can be inhibited.

In addition, the top ends of the bent portions 7331p of the metal member may be further bent to provide reception surfaces for the adhesive 7332. This can prevent permeation of the adhesive 7332 into the space between the bent portions 7331p of the metal member and the securing part 733. Therefore, variation of the attachment position of the metal member 7331 and the securing part 733 can be prevented.

Thus, according to the feature of the present example, the object lens actuator can be provided in which a tilt of the object lens due to a change of an ambient temperature is further inhibited even when the metal member is attached to the resin-based securing part.

EXAMPLE 3

Figure 5:
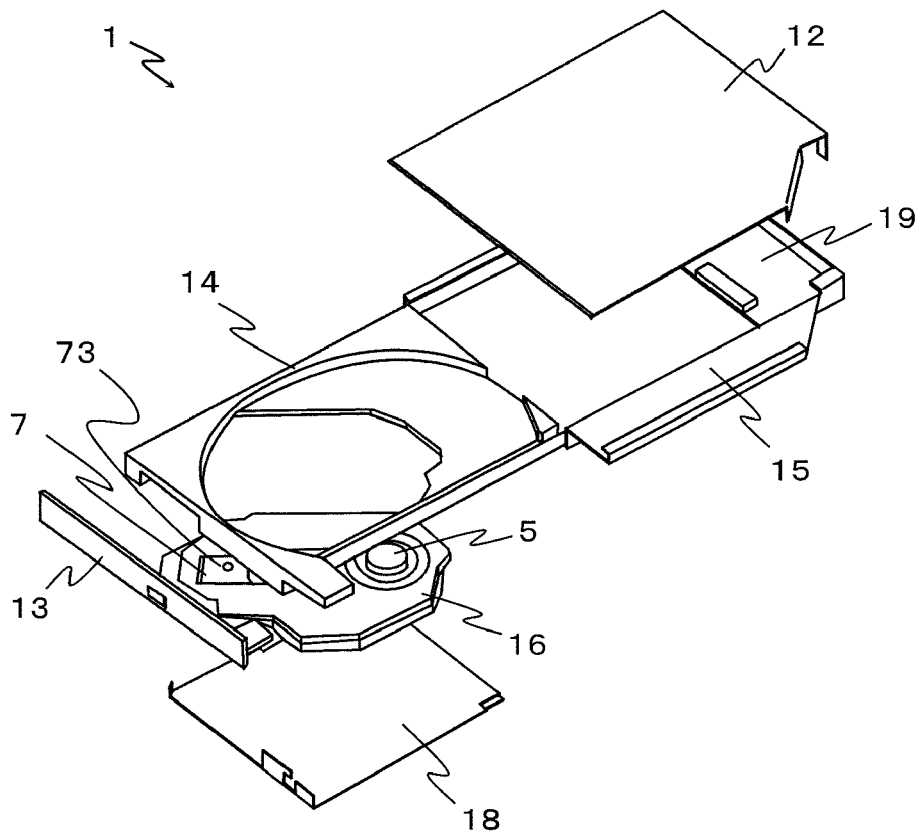
FIG. 5 is an exploded perspective view of a disc drive mounting the object lens actuator of the present invention.

FIG. 5 is an exploded perspective view of a disc drive 1 to which the object lens actuator 73 of the present invention has been applied.

In FIG. 5, the disc drive 1 mainly includes a housing 15, a disc tray 14 for carrying a disc (not shown) into or out of the drive, and a controller 19 for drive controlling and signal processing of electronic components mounted in the disc drive 1.

A top case 12 and a front panel 13 are attached to a top surface and a front surface of the housing 15 respectively. A unitized mechanism part (hereinafter called a unit mechanism) 16 is mounted to the disc tray 14. An under cover 18 is attached to a bottom surface of the unit mechanism 16. A spindle motor 5 for rotating a disc (not shown), an optical head 7 for playing or writing information from or onto a disc, and a feed motor (not shown) for moving the optical head 7 in the radial direction. In addition to the object lens actuator 73, the optical head 7 includes optical components such as a laser diode (not shown) and a photo detector.

Figure 6:
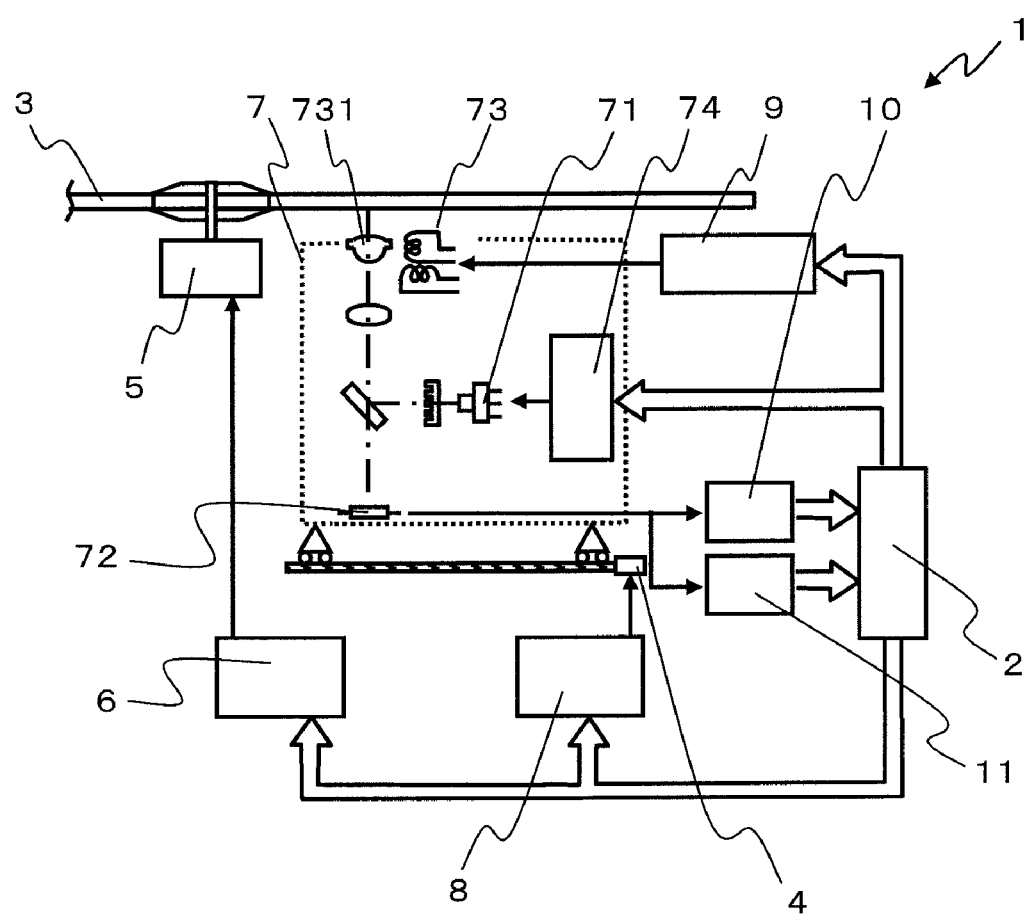
FIG. 6 is a block diagram of the disc drive mounting the object lens actuator of the present invention.

Next, the circuit structure of the disc drive 1 is explained in reference to FIG. 6. FIG. 6 is a block diagram of the disc drive 1 to which the object lens actuator 73 of the present invention has been applied.

In FIG. 6, a disc rotation control circuit 6 rotates the spindle motor 5 mounting a disc 3 in response to an instruction from a signal processing circuit 2. In response to an instruction from the signal processing circuit 2, a feed control circuit 8 drives the feed motor 4 to move the optical head 7 to a prescribed position of the disc 3 in the radial direction. A laser drive circuit 74 makes a laser diode 71 emit light in response to an instruction from the signal processing circuit 2.

The laser light emitted from the laser diode 71 is focused on the disc 3 through the object lens 731. The focused laser light is reflected by the disc 3, passes through the object lens 731 again, and is incident on the photo detector 72. A detection signal obtained by the photo detector 72 is sent to a servo signal detection circuit 10 and a play signal detection circuit 11. The servo signal detection circuit 10 generates a servo signal based on a detected signal, and sends the servo signal to an object lens drive circuit 9. The object lens drive circuit 9 applies driving power to the object lens actuator 73, and controls a position of the object lens 731.

The play signal detection circuit 11 generates a play signal from a detection signal, and plays information on the disc 3.

The disc drive 1 uses the object lens actuator 73 of the present invention. Therefore, a relative tilt of the disc 3 and object lens 731 can be inhibited to improve quality of writing and playing.

As described above, according to the present invention, the object lens actuator can be provided in which a tilt of the object lens can be inhibited even when the metal component attached to the resin based securing part expands and shrinks due to a change of an ambient temperature, and quality of writing and playing can be improved in the disc drive using the actuator.

It should be understood by those skilled in the art that various modifications, combinations, sub-combinations and alterations may occur depending on design requirements and other factors insofar as they are within the scope of the appended claims or the equivalents thereof.

What is claimed is:

1. An object lens actuator comprising:
    an object lens for forming a laser spot on a writing surface of an optical disc;
    a lens holder attaching the object lens thereto;
    a plurality of support members coupled to the lens holder; and
    a securing part movably supporting the lens holder in a focusing direction and a tracking direction via the support members,
        a metal member being attached in a space in the focusing direction of the securing part,
        the metal member including:
            a flat portion having a normal in the focusing direction; and
            bent portions extending in the focusing direction from respective ends of the flat portion in the tracking direction,
            top ends of the bent portions of the metal member and an inner wall of the space of the securing part being coupled and secured.

2. The object lens actuator according to claim 1 wherein the bent portions and the securing part are secured using an adhesive.

3. The object lens actuator according to claim 1 wherein the space of the securing part to insert the metal member has a larger volume than that of the metal member.

4. The object lens actuator according to claim 1 wherein the metal member is secured in a central portion of the space of the securing part.

5. The object lens actuator according to claim 1 wherein the securing part has an opening therethrough in the focusing direction, and in the opening, the metal member is coupled to the securing part between each outermost two of the support members in the focusing direction.

6. A disc drive using the object lens actuator according to claim 1.

7. A disc drive using the object lens actuator according to claim 2.

8. A disc drive using the object lens actuator according to claim 3.

9. A disc drive using the object lens actuator according to claim 4.

10. A disc drive using the object lens actuator according to claim 5.

* * * * *